United States Patent [19]

Suganuma et al.

[11] Patent Number: 5,505,277
[45] Date of Patent: Apr. 9, 1996

[54] CONTROL FOR ELECTRIC ASSIST VEHICLE

[75] Inventors: Yasuo Suganuma; Katsumi Ikuma; Sueji Nagai; Fumio Ito; Syoichiro Miyata, all of Iwata, Japan

[73] Assignee: Yamaha Hatsudoki Kabushiki Kaisha, Iwata, Japan

[21] Appl. No.: 279,248

[22] Filed: Jul. 21, 1994

[30] Foreign Application Priority Data

Jul. 23, 1993 [JP] Japan .................................. 5-201953

[51] Int. Cl.$^6$ ................................................. B62M 23/02
[52] U.S. Cl. ......................... 180/206; 180/207; 180/220
[58] Field of Search .................................. 180/206, 220, 180/207

[56] References Cited

U.S. PATENT DOCUMENTS

| | | |
|---|---|---|
| 4,364,448 | 12/1982 | Ikuma . |
| 5,024,286 | 6/1991 | Lean et al. . |
| 5,226,501 | 7/1993 | Takata . |
| 5,375,676 | 12/1994 | Takata et al. ........................... 180/206 |

FOREIGN PATENT DOCUMENTS

| | | |
|---|---|---|
| 0273387 | 7/1988 | European Pat. Off. . |
| 0432764 | 6/1991 | European Pat. Off. . |
| 0517224 | 12/1992 | European Pat. Off. . |
| 2259741 | 8/1975 | France . |
| 4129736 | 3/1992 | Germany . |
| 50-125438 | 10/1975 | Japan . |
| 56-76590 | 6/1981 | Japan . |
| 2-74491 | 3/1990 | Japan . |

OTHER PUBLICATIONS

European Search Report dated Aug. 2, 1993.
Patent Abstract of Japan vol. 14, No. 113 (M–0944) 2 Mar. 1990 & JP–A–13 14 685 (Japan II M KK) 19 Dec. 1989.
Patent Abstract of Japan vol. 14, No. 262 (M–0981) 6 Jun. 1990 & JP–A–20 74 491 (Matsushita Electric Works Ltd).

*Primary Examiner*—Mitchell J. Hill
*Attorney, Agent, or Firm*—Knobbe, Martens, Olson & Bear

[57] ABSTRACT

An electrically power assisted, manually operated vehicle, such as a bicycle, that includes a force sensor for varying the amount of power assist by an electrical motor in response to the manual force input. In addition, a vehicle speed sensor is incorporated for sensing vehicle speed. An abnormality condition detector detects both the outputs from the force sensor and the vehicle speed sensor and indicates an abnormality and discontinues the supply of electrical power to the electric motor in the event of a discrepancy in the outputs of the sensors.

20 Claims, 4 Drawing Sheets

CONTROL FOR ELECTRIC ASSIST VEHICLE

BACKGROUND OF THE INVENTION

This invention relates to an improved control for an electric assist vehicle and more particularly to an improved control that will ensure against electric driving of the vehicle in the event of abnormal conditions.

It has been proposed to provide a manually powered vehicle with an electric assist so as to assist the occupant in the manual propulsion of the vehicle. For example, the copending application of Nozomu Takata, Ser. No. 08/059,540, filed May 10, 1993 and entitled "Bicycle with Electric Motor," now U.S. Pat. No. 5,370,200, issued Dec. 6, 1994, and assigned to the assignee hereof, shows a manually powered vehicle such as a bicycle wherein there is provided an electric power assist for assisting the occupant in the powering of the vehicle. This type of mechanism includes an arrangement that senses the manual input force or torque exerted by the occupant and then powers an electric motor by connecting it to a battery in such a way so as to provide a degree of assist in proportion to the manual input force.

This type of vehicle has a large number of advantages. However, it is important to ensure that the amount of electrical power supplied to the electric motor cannot be too great under certain circumstances so as to permit the speed of the vehicle to become excessive. In addition, it should be ensured that the system will not permit the operator to bypass the control and operate the electric motor manually which might also result in excessive speed of the vehicle. The aforenoted copending application discloses a number of ways in which these effects can be obtained.

In all of the systems disclosed in the aforenoted copending application, the control senses only abnormal variations in the force sensed and provides safety disconnect of the electric motor power in the event the force sensor becomes inoperative or is bypassed. Although this has a number of advantages, further improvements or alternative constructions may be desirable.

It is, therefore, a principal object of this invention to provide an improved electrically assisted vehicle that has safety features.

It is a further object of this invention to provide an improved electrically assisted vehicle wherein both the speed and the input force are compared so as to determine when an abnormal condition exists.

SUMMARY OF THE INVENTION

This invention is adapted to be embodied in an electric motor assisted, occupant powered vehicle having a drive for powering the vehicle. A manual operator is provided for driving by the manual force inputted by an occupant for manual operation of the drive. An electric motor is also provided and a transmission couples the electric motor to the drive. A force sensor is provided for sensing the manual force applied by the occupant to the manual operator and control means supply electrical power to the electrical motor in response to the output of the force sensor. A vehicle speed sensor is also provided and an abnormal control senses an abnormality in the output of the force sensor and the vehicle speed sensor to preclude the supply of electric power to the electric motor.

DETAILED DESCRIPTION OF THE PREFERRED EMBODIMENTS OF THE INVENTION

Figure 1:
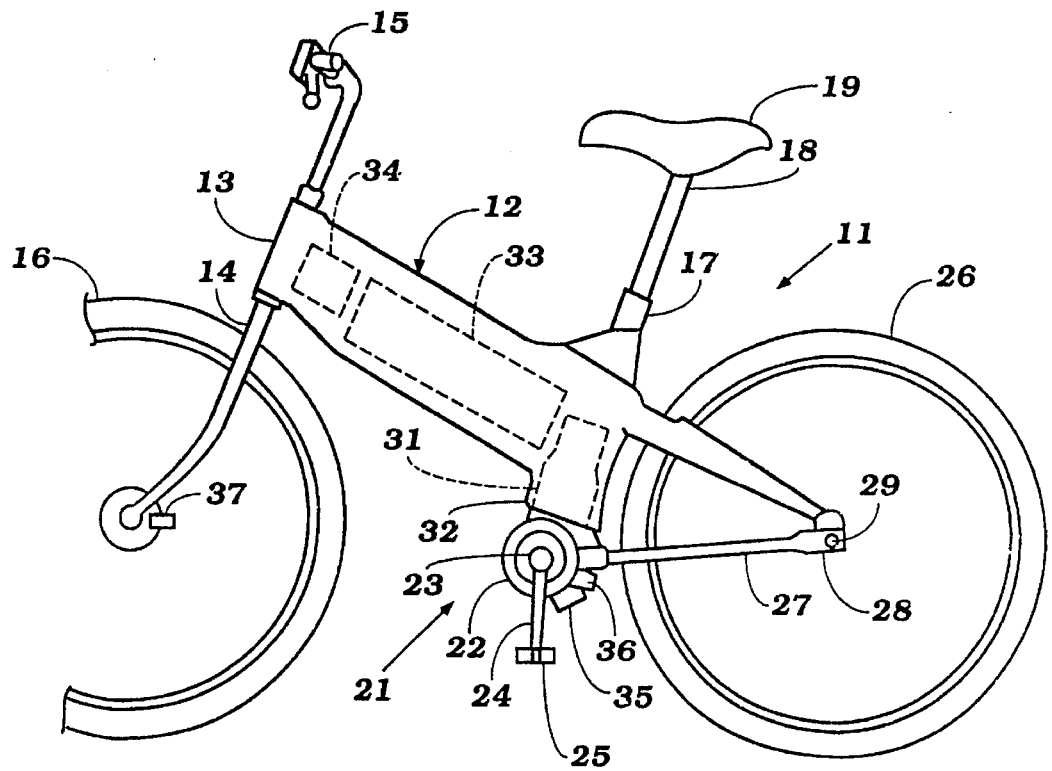
FIG. 1 is a partial side elevational view of an electric motor assisted, occupant propelled vehicle, in the form of a bicycle, constructed in accordance with an embodiment of the invention.

Referring now in detail to the drawings and initially to FIG. 1, an occupant powered, electric power assisted vehicle in the form of a bicycle is depicted and identified generally by the reference numeral 11. Although the invention is described in conjunction with a bicycle, it will be readily apparent to those skilled in the art how the invention can be utilized with a wide variety of other types of occupant powered vehicles to provide electrical assist therefore.

The bicycle 11 includes a frame assembly, indicated generally by the reference numeral 12 and which includes a head pipe 13 that journals a front fork 14 for steering movement under the control of a handlebar assembly 15. A front wheel 16 is rotatably journalled by the front fork 14 in a well known manner.

A seat pillar 17 of the frame assembly 12 adjustably supports a seat post 18 on which a seat 19 is carried for accommodating an occupant.

A power unit, indicated generally by the reference numeral 21 is positioned at the lower end of the frame assembly 12 beneath the seat 19 and includes a bottom case 22 that rotatably journals a crankshaft 23 having a pair of crank arms 24 extending from its opposite sides and to which pedals 25 are journalled in a well-known manner. The pedals 25 along with the associated crank arms 24 and crankshaft 25 comprise a manually powered operator that may be operated by a rider seated on the seat 19 and the pedals drive a rear wheel 26 that is supported by the frame assembly 12 at the rear end of a pair of support arms 27 that have flattened portions 28 to receive an axle 29 associated with and journaling the rear wheel 26 in a known manner. The manner in which the crankshaft 23 drives the rear wheel 26 will be described generally later.

In addition to the manual or occupant control for drive of the rear wheel 26, there is also provided an electric motor and transmission assembly 31 that is mounted in a lower portion 32 of the frame 12 and which is coupled to the transmission arrangement, which will also be described later, for electric power assist in the drive of the rear wheel 26.

The electric motor 31 receives power from a battery 33 that is mounted within the frame assembly and which power is supplied through a controller 34.

The control for determining the amount of electrical power supplied from the battery 33 through the controller 34 to the electric motor 31 is controlled in response to certain inputs including those of a force or torque sensor, indicated generally by the reference numeral 35 and a vehicle speed sensor 36 which is also connected with the drive assembly 21. Alternatively, a front wheel speed sensor 37 may be associated with the front wheel 16 for providing a speed signal to the control system.

Figure 2:
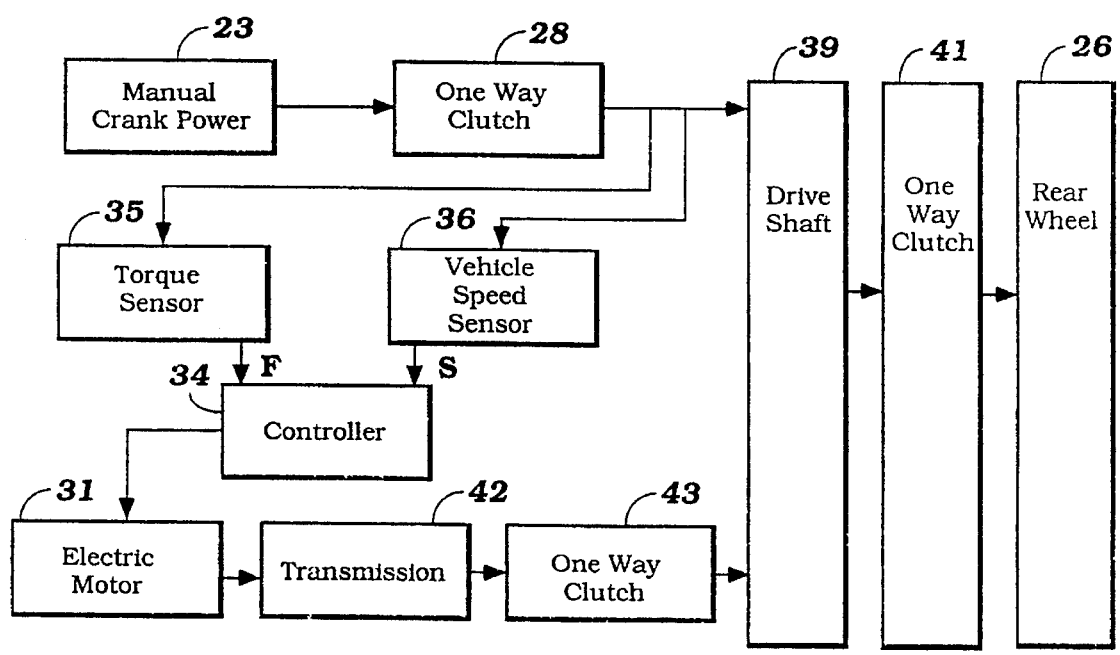
FIG. 2 is a schematic block diagram showing the interrelationship of the various components of the drive system.

FIG. 2 shows the drive arrangement and certain elements of the control schematically. It should be noted that the drive assembly contains certain components which are disclosed in more detail in copending application Ser. No. 59,540, the disclosure of which is incorporated herein by reference. Obviously, other types of drive arrangements may also be employed.

The drive arrangement includes a transmission that transmits power from the manual crankshaft 23 to the rear wheel 26 through a drive shaft (not shown) that extends through one of the frame tubes 27. This transmission includes a one-way clutch 38 which is disposed between the crankshaft 23 and the drive shaft. This transmission may further include a planetary speed reduction unit that includes a sun gear which is connected to the torque sensor 35 in a manner described in the copending application. It should be noted that this torque sensor senses actual torque exerted on the crankshaft 23 and not the force of the operator. The operator's force, although constant will provide a torque that varies cyclically depending upon the angle of the crank arms 24 as is well known.

The output from the one-way clutch 38 and transmission is transmitted to the drive shaft, shown schematically at 39 in FIG. 2 which, in turn, is coupled to the rear wheel 26 through a further transmission which includes a one-way or free-wheeling clutch, indicated schematically at 41 in FIG. 2.

The electric motor 31, as has been noted, drives a speed reducing transmission, shown schematically at 42 in FIG. 2 and this may constitute a planetary transmission as shown in the aforenoted copending application. The transmission 42 drives the drive shaft 39 through a further one-way clutch, shown schematically at 43, which permits driving of the drive shaft 39 but which will permit the drive shaft 39 to free wheel. Since this invention deals particularly with the manner in which the motor 31 is controlled and particularly during abnormal conditions, further description of the transmission is not believed to be necessary since the invention may be used with a wide variety of types of transmissions.

Figure 3:
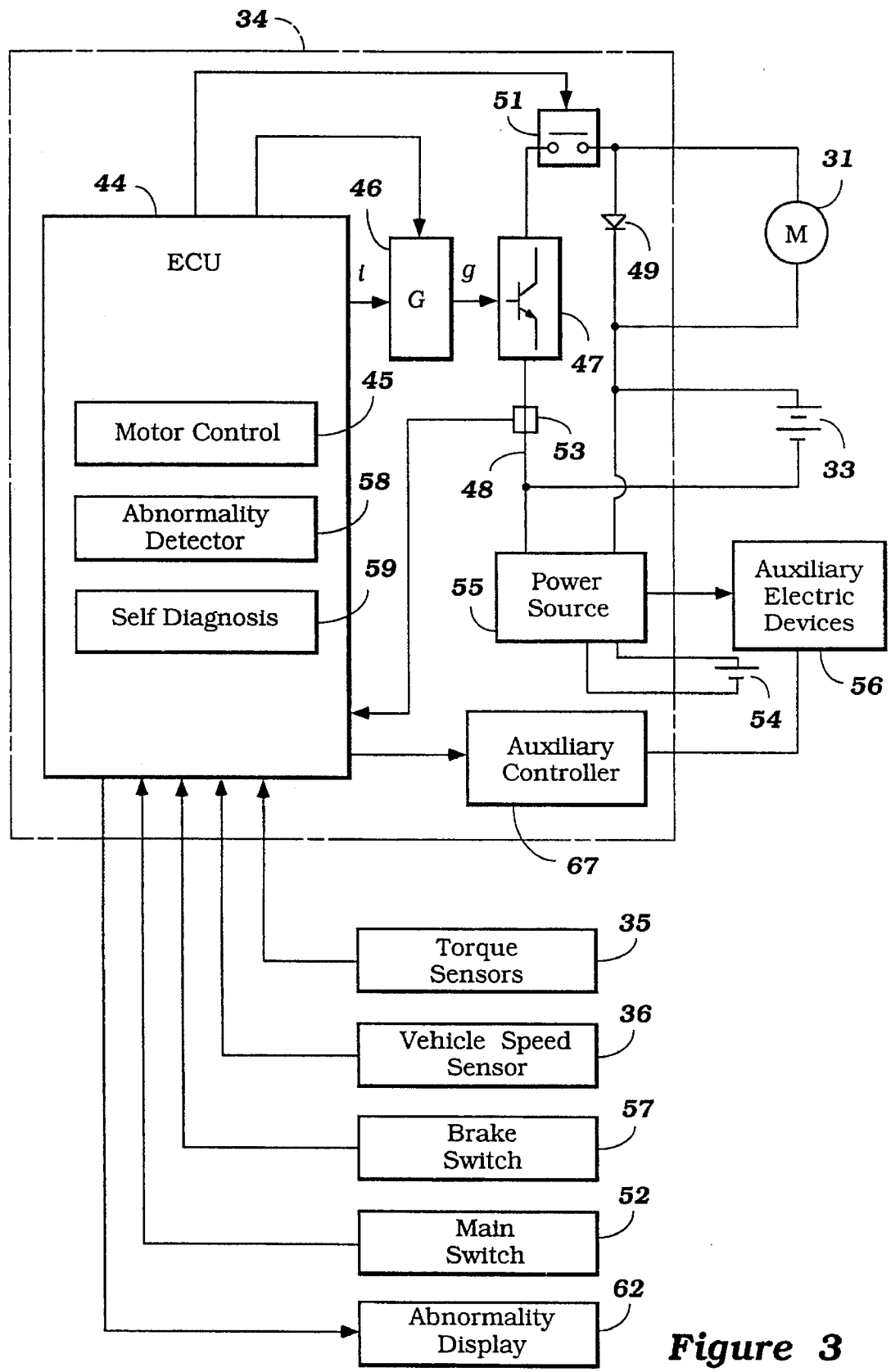
FIG. 3 is a schematic view showing the electrical components of the system.

The control circuit is shown partially schematically in FIG. 3 and will now be described in more detail by reference to that figure. As seen in FIG. 3, the controller 34 includes an ECU, indicated generally by the reference numeral 44 which has a motor control section, indicated by the reference numeral 45 that is preprogrammed so as to provide the appropriate degrees of electrical power to the motor 31 in response to the input of the manual crankshaft 23 by the operator on the seat 19 in any known type of control strategy, for example, those described in the aforenoted copending application for normal motor control. This control output i is transmitted to a gate circuit 46 which selectively switches a switch circuit 47 by a signal g so as to vary the duty cycle time of electrical power supplied in the battery 33 to the motor 31 through a main circuit 48 in response to the varying conditions. The switch 47 may be a known type such as an MOS-FET. A diode 49 is provided in the circuit so as to avoid the backflow of EMF to the battery 33 during coasting modes. In addition, a main relay 51 is provided in the main circuit 47 and is switched on and off by a main switch 52. A power tap takes power out of the main circuit 48 and powers the ECU 44. As previously noted, the specific normal control for the motor 31 may be of any known type and since this forms no part of the invention, a further description of it is not believed to be necessary.

The system further includes a small auxiliary battery 54 which is charged from the main battery 33 through a power source circuit 55 and which also supplies power to auxiliary electrical devices, shown at 56 in FIG. 3 such as lights or the like.

The system may also be provided with an arrangement for precluding the transmission of power to the electric motor 31 when the brakes of the bicycle 11 are energized and for this purpose a brake switch 57 is provided that is connected to the ECU 44 and which will disable the circuit 46 and prevent energization of the motor 31 when the brakes are applied.

The remaining components of the electrical system include an abnormality control including a abnormality detector, indicated generally by the reference numeral 58, and a self-diagnosis circuit 59, which both form portions of the ECU 44. In addition, an auxiliary controller 61 is incorporated that switches on and off the auxiliary electrical devices. Furthermore, the system is provided with an abnormality display 62 which may consist of a warning light or the like.

Figure 4:
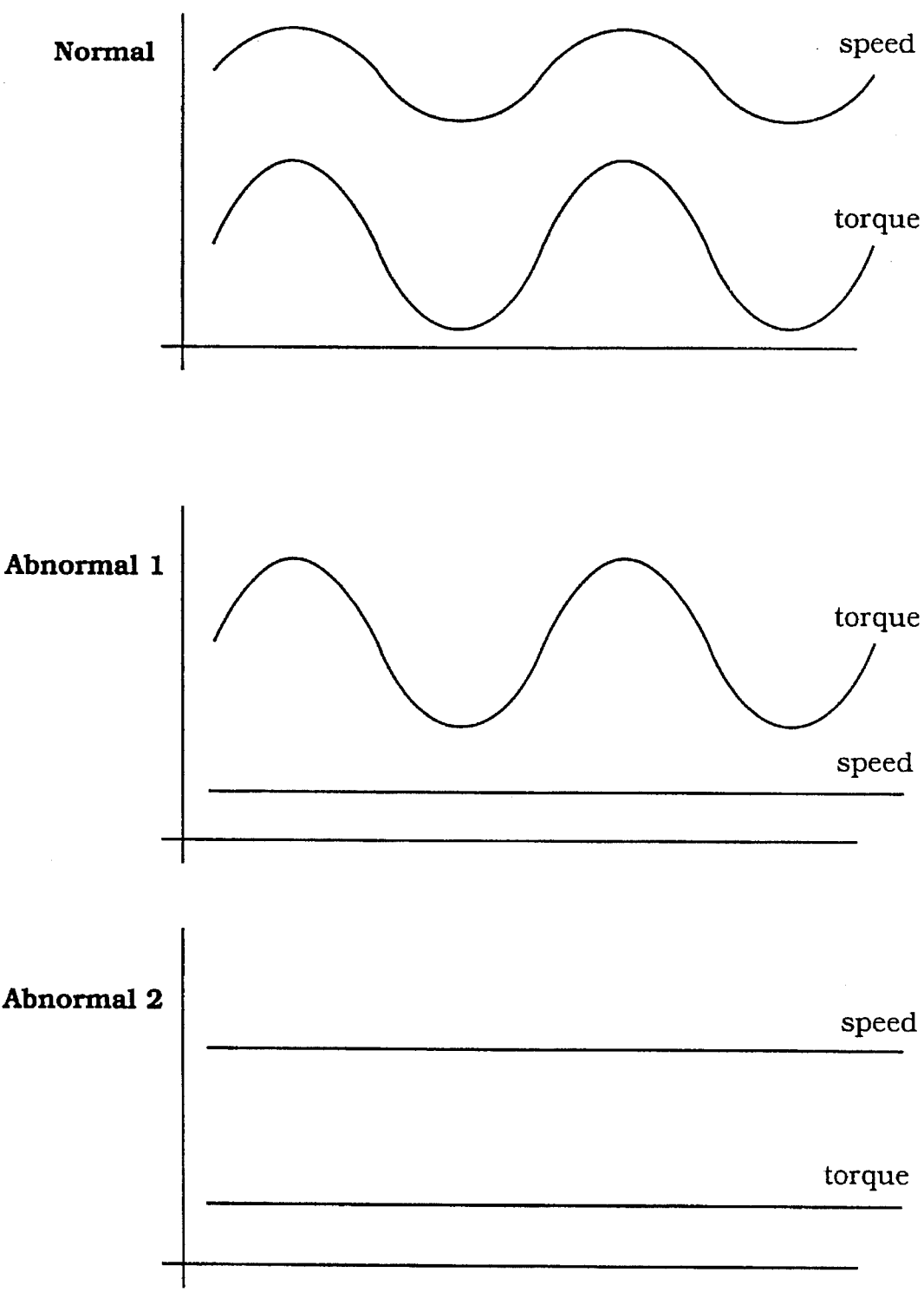
FIG. 4 is a graphical view showing the different types of abnormalities which may exist.

Before referring to the control routine of FIG. 5, the way in which abnormal conditions are detected will be described by particular reference to FIG. 4 which is a graphical view that shows the condition of the torque output sensed by the torque sensor 35 and the vehicle speed output as outputted by the vehicle speed sensor 36. As shown in the normal curve, the torque varies cyclically assuming a constant input force and the speed will also vary cyclically but to a much smaller amplitude. The first abnormal condition shown is a condition where the torque input is substantially normal but the indicated vehicle speed is quite low and constant, a condition that could be existent if the speed sensor has failed. The other abnormal condition shows where the indicated speed of the vehicle maintains substantially constant but is very little indicated torque output which can be a condition indicative of a breaking of a wire in the torque sensor and/or some disabling would cause the motor to be operated constantly. The present system operates to sense these abnormal conditions and then prevent the transmission of electrical power to the electric motor when any of the abnormal conditions are sensed and also to indicate the warning display above referred to.

Figure 5:
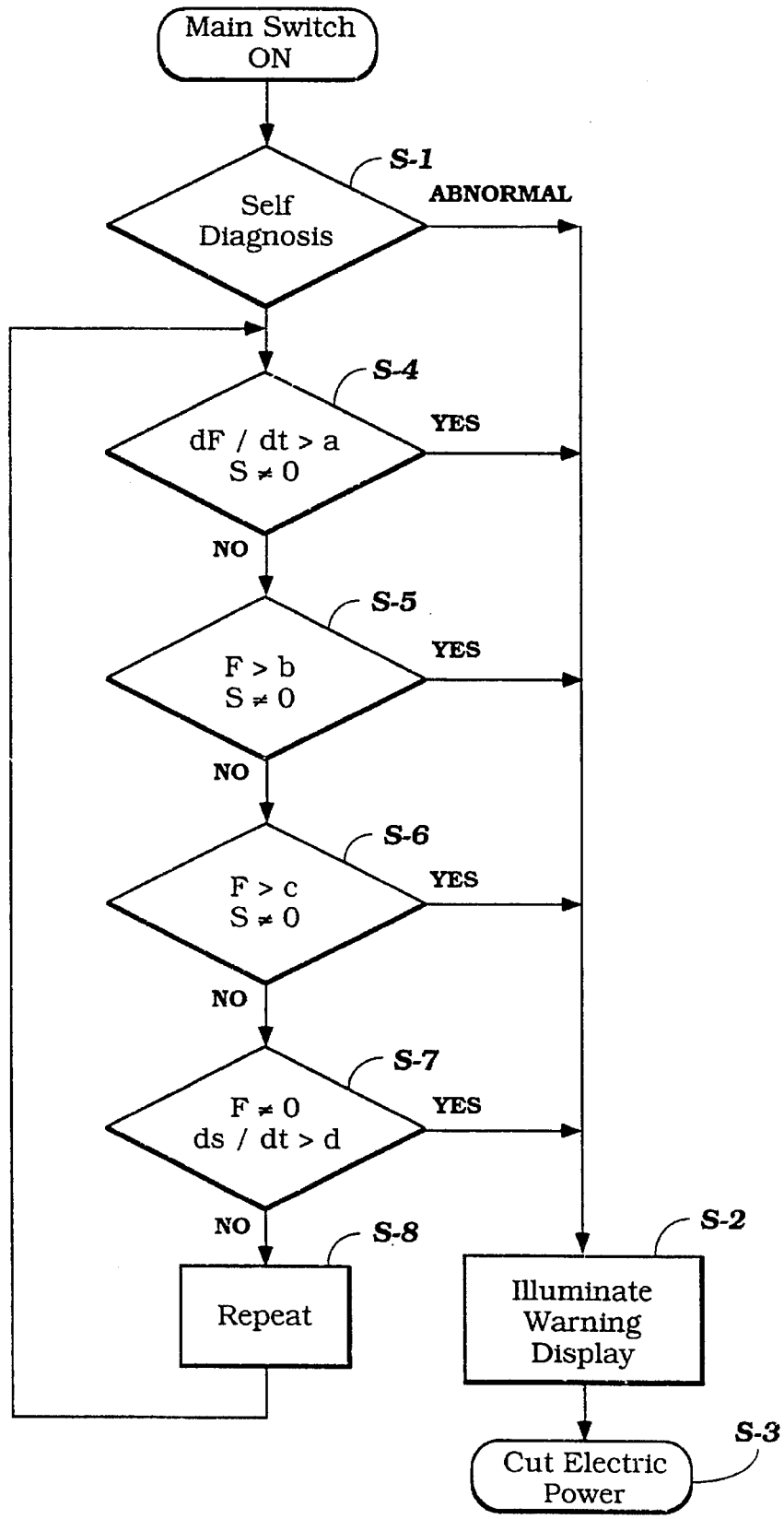
FIG. 5 is a block diagram of a control routine which may be utilized to practice the invention.

Referring to FIG. 5, the program begins when the main switch is turned on and then moves to the step S1 to perform the self-diagnostic function. If at the step S1 the self-diagnostic system, which may operate in any known manner, indicates an abnormality, the program moves to the step S2 so as to illuminate the warning display 62 and then moves to the step S3 so as to abort or prevent the supply of any electrical power from the battery 33 to the motor 31 by disabling the output circuit 46 and avoid switching the device 47 so as to energize the motor 31.

Assuming that the self-diagnostic system indicates normal operation the program then moves to the performance of four different types of checking functions indicated at the steps S4, S5, S6, and S7 in sequence. These steps S4, S5, S6, and S7 are shown in a predetermined preferred sequence, but it should be readily apparent to those skilled in the art that other types of sequences can be employed for determining abnormalities utilizing both the torque sensor 35 and the vehicle speed sensor 36.

The first sensing condition determined at the step S4 is to determine if the change in output torque dF in relation to time dt is greater than a predetermined value a when the bicycle is actually moving at a speed indicated by the speed sensor 36. If the change in force in relation to time is greater than the value a, which is determined experimentally, then it is determined that there is a defect in the torque sensor 35 and the program moves to the abnormal routine of illuminating the warning display at the step S2 and cutting electrical power at the step S3.

If, however, no abnormality is determined at the step S4, then another checking step is accomplished at the step S5. This step determines if the actual force F as outputted by the torque sensor 35 is greater than a predetermined force b when the bicycle is traveling and the vehicle speed sensor 36 indicates an actual speed condition. This high force sensed by the force sensor indicates either that there has been an electrical failure in the force sensor or the system has been bypassed by the operator to indicate the calling for a larger amount of power assist than desired which could result in overspeed of the bicycle. If this occurs, the program then moves to the abnormal display modes of the steps S2 and S3 as previously described.

Assuming that the two abnormal conditions tested for at the steps S4 and S5 do not exist, then the program moves to the third stage S6, so as to determine if there is a force output from the torque sensor 35 while the speed sensor 36 indicates that the bicycle is not moving and the speed is zero. This would indicate that there is a pedal force exerted when the bicycle is held stationary either by the application of the brakes or by placing it in engagement with a fixed object. In either condition, it is not desirable to have the electric motor 31 operated and if this condition is determined the program moves to the abnormal mode of the steps S2 and S3 as aforedescribed.

Assuming none of the conditions tested for at the steps S4, S5, and S6, are encountered, the program then moves to the step S7 so as to provide a testing of the functioning of the speed sensor and this is done by determining first that the torque sensor 35 outputs a signal and then the rate of change in speed with respect to time (ds/dt). This value is then compared with a preset value d which is the maximum normal anticipated expected change in speed, which again is determined experimental. This condition can be caused by a malfunction or wire breakage in the speed sensor 36 and if this condition is determined to be abnormal, the program again moves to the abnormal conditions of steps S2 and S3.

If all of the steps S4, S5, S6, and S7 have indicated no abnormality from either the torque or speed sensors 35 and 36, respectively, the program then moves to the step S8 so as to continue to repeat the test S4, S5, S6, and S7 during the bicycle operation. As noted above, it is not necessary that these steps be described order and additional testing methods to determine the various types of abnormalities noted may be employed or additional abnormalities using these sensors. The tests may be repeated automatically during running or may return to normal running control when the abnormality disappears. Also, it may be desirable to turn off the main switch 51 when an abnormality is determined and this is within the scope of the invention.

It should be readily apparent from the foregoing description that the described embodiments of the invention are very effective in employing the two sensors of the system to determine various types of abnormalities and to protect against the application of electrical power assist under these abnormalities. Of course, the foregoing description is that of preferred embodiments of the invention and various changes and modifications may be made without departing from the spirit and scope of the invention, as defined by the appended claims.

We claim:

1. An electrical motor assisted, occupant powered vehicle having a drive for powering said vehicle, a manually powered operator for receiving a manual force inputted by an occupant for manual operation of said drive, an electric motor, a transmission for coupling said electric motor to said drive, a force sensor for sensing the manual force applied by the occupant to said manually powered operator, control means for supplying electrical power to said electric motor in response to the output of said force sensor, a vehicle speed sensor, and an abnormality control for sensing an abnormality in the output of said force sensor and said vehicle speed sensor to preclude the supply of electrical power to said electric motor.

2. The electrical motor assisted, occupant powered vehicle as defined by claim 1, wherein the abnormality control senses a variation in relationship of the speed signal and the force signal from the normally expected relationship.

3. The electrical motor assisted, occupant powered vehicle as defined by claim 1, wherein the abnormality control senses a condition when the change in force sensed by the force sensor in a given time exceeds a predetermined amount and the speed sensor is indicating an output signal indicative that the vehicle is traveling.

4. The electrical motor assisted, occupant powered vehicle as defined by claim 3, wherein the abnormality control further senses a condition when the force sensed by the force sensor is greater than the predetermined amount and the vehicle speed sensor indicates that the vehicle is traveling.

5. The electrical motor assisted, occupant powered vehicle as defined by claim 4, wherein the abnormality control further senses a condition when the force indicated by the force sensor exceeds a predetermined force and the vehicle is stationary as indicated by the failure of the vehicle speed sensor to output a signal.

6. The electrical motor assisted, occupant powered vehicle as defined by claim 4, wherein the abnormality control further senses a condition when the change in speed in relation to time as sensed by the speed sensor is greater than a predetermined amount and the force sensor indicates the output of a force.

7. The electrical motor assisted, occupant powered vehicle as defined by claim 6, wherein the abnormality control further senses a condition when the force indicated by the force sensor exceeds a predetermined force and the vehicle is stationary as indicated by the failure of the vehicle speed sensor to output a signal.

8. The electrical motor assisted, occupant powered vehicle as defined by claim 1, wherein the abnormality control senses a condition when the force sensed by the force sensor is greater than the predetermined amount and the vehicle speed sensor indicates that the vehicle is traveling.

9. The electrical motor assisted, occupant powered vehicle as defined by claim 1, wherein the abnormality control senses a condition when the force indicated by the force sensor exceeds a predetermined force and the vehicle is stationary as indicated by the failure of the vehicle speed sensor to output a signal.

10. The electrical motor assisted, occupant powered vehicle as defined by claim 1, wherein the abnormality control senses a condition when the change in speed in relation to time as sensed by the speed sensor is greater than a predetermined amount and the force sensor indicates the output of a force.

11. The electrical motor assisted, occupant powered vehicle as defined by claim 1, wherein the manually powered operator comprises a pedal assembly consisting of at least one pedal rotatable about a crank axis and wherein the force sensor senses the torque outputted by the pedal assembly.

12. The electrical motor assisted, occupant powered vehicle as defined by claim 11, wherein the abnormality control senses a variation in the relationship of the speed signal and the torque signal from the normally expected relationship.

13. The electrical motor assisted, occupant powered vehicle as defined by claim 11, wherein the abnormality control senses a condition when the change in torque sensed by the force sensor in a given time exceeds a predetermined amount and the speed sensor is indicating an output signal indicative that the vehicle is traveling.

14. The electrical motor assisted, occupant powered vehicle as defined by claim 13, wherein the abnormality control further senses a condition when the torque sensed by the force sensor is greater than a predetermined amount and the vehicle speed sensor indicates that the vehicle is traveling.

15. The electrical motor assisted, occupant powered vehicle as defined by claim 14, wherein the abnormality control further senses a condition when the torque indicated by the force sensor exceeds a predetermined torque and the vehicle is stationary as indicated by the failure of the vehicle speed sensor to output a signal.

16. The electrical motor assisted, occupant powered vehicle as defined by claim 14, wherein the abnormality control further senses a condition when the change in speed in relation to time as sensed by the speed sensor is greater than a predetermined amount and the force sensor indicates the output of a torque.

17. The electrical motor assisted, occupant powered vehicle as defined by claim 16, wherein the abnormality control further senses a condition when the torque indicated by the force sensor exceeds a predetermined force and the vehicle is stationary as indicated by the failure of the vehicle speed sensor to output a signal.

18. The electrical motor assisted, occupant powered vehicle as defined by claim 11, wherein the abnormality control senses a condition when the torque sensed by the force sensor is greater than the predetermined amount and the vehicle speed sensor indicates that the vehicle is traveling.

19. The electrical motor assisted, occupant powered vehicle as defined by claim 11, wherein the abnormality control senses a condition when the torque indicated by the force sensor exceeds a predetermined torque and the vehicle is stationary as indicated by the failure of the vehicle speed sensor to output a signal.

20. The electrical motor assisted, occupant powered vehicle as defined by claim 11, wherein the abnormality control senses a condition when the change in speed in relation to time as sensed by the speed sensor is greater than a predetermined amount and the force sensor indicates the output of a torque.

* * * * *